US011864182B2

(12) United States Patent
Huang et al.

(10) Patent No.: US 11,864,182 B2
(45) Date of Patent: Jan. 2, 2024

(54) DEMODULATION REFERENCE SIGNAL MULTIPLEXING FOR UPLINK COMMUNICATIONS

(71) Applicant: QUALCOMM Incorporated, San Diego, CA (US)

(72) Inventors: Yi Huang, San Diego, CA (US); Peter Gaal, San Diego, CA (US); Ahmed Elshafie, San Diego, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/375,839

(22) Filed: Jul. 14, 2021

(65) Prior Publication Data
US 2022/0086823 A1 Mar. 17, 2022

Related U.S. Application Data

(60) Provisional application No. 62/706,805, filed on Sep. 11, 2020.

(51) Int. Cl.
*H04W 72/21* (2023.01)
*H04L 5/00* (2006.01)
*H04W 72/0453* (2023.01)
*H04W 72/0446* (2023.01)
*H04W 72/1263* (2023.01)

(52) U.S. Cl.
CPC .......... *H04W 72/21* (2023.01); *H04L 5/0051* (2013.01); *H04W 72/0446* (2013.01); *H04W 72/0453* (2013.01); *H04W 72/1263* (2013.01)

(58) Field of Classification Search
CPC ............. H04W 72/21; H04W 72/0446; H04W 72/0453; H04W 72/1263; H04L 5/0051
See application file for complete search history.

(56) References Cited

U.S. PATENT DOCUMENTS

2021/0153207 A1* 5/2021 Bhamri ................. H04L 5/0051
2022/0191903 A1* 6/2022 Bae ....................... H04L 1/1893

OTHER PUBLICATIONS

R1-2006820 Qualcomm "Potential coverage enhancement techniques for PUSCH" 3GPP WG1 #102 e-Meeting Aug. 17-28, 2020 (Year: 2020).*

\* cited by examiner

*Primary Examiner* — Basil Ma
(74) *Attorney, Agent, or Firm* — Arun Swain

(57) ABSTRACT

Various aspects of the present disclosure generally relate to wireless communication. In some aspects, a user equipment (UE) may multiplex one or more demodulation reference signals (DMRSs) with data or uplink control information in each symbol of one or more physical uplink communications. The UE may transmit the symbols of the one or more physical uplink communications. The physical uplink communications may include physical uplink repetitions. Numerous other aspects are provided.

26 Claims, 13 Drawing Sheets

DEMODULATION REFERENCE SIGNAL MULTIPLEXING FOR UPLINK COMMUNICATIONS

CROSS-REFERENCE TO RELATED APPLICATION

This Patent Application claims priority to U.S. Provisional Patent Application No. 62/706,805, filed on Sep. 11, 2020, entitled "DEMODULATION REFERENCE SIGNAL MULTIPLEXING FOR UPLINK REPETITIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for demodulation reference signal multiplexing for uplink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes multiplexing one or more demodulation reference signals (DMRSs) with data or uplink control information (UCI) in each symbol of one or more physical uplink communications, and transmitting the symbols of the one or more physical uplink communications.

In some aspects, a method of wireless communication performed by a base station includes receiving symbols from a UE in one or more physical uplink communications, and demultiplexing the symbols to obtain one or more DMRSs from each symbol in the one or more physical uplink communications.

In some aspects, a UE for wireless communication includes memory, one or more processors coupled to the memory, and instructions stored in the memory and operable, when executed by the one or more processors, to cause the UE to multiplex one or more DMRSs with data or UCI in each symbol of one or more physical uplink communications, and transmit the symbols of the one or more physical uplink communications.

In some aspects, a base station for wireless communication includes memory, one or more processors coupled to the memory, and instructions stored in the memory and operable, when executed by the one or more processors, to cause the base station to receive symbols from a UE in one or more physical uplink communications, and demultiplex the symbols to obtain one or more DMRSs from each symbol in the one or more physical uplink communications.

In some aspects, a non-transitory computer-readable medium stores one or more instructions for wireless communication that, when executed by one or more processors of a UE, cause the UE to multiplex one or more DMRSs with data or UCI in each symbol of one or more physical uplink communications, and transmit the symbols of the one or more physical uplink communications.

In some aspects, a non-transitory computer-readable medium stores one or more instructions for wireless communication that, when executed by one or more processors of a base station, cause the base station to receive symbols from a UE in one or more physical uplink communications, and demultiplex the symbols to obtain one or more DMRSs from each symbol in the one or more physical uplink communications.

In some aspects, an apparatus for wireless communication includes means for multiplexing one or more DMRSs with data or UCI in each symbol of one or more physical uplink communications and means for transmitting the symbols of the one or more physical uplink communications.

In some aspects, an apparatus for wireless communication includes means for receiving symbols from a UE in one or more physical uplink communications and means for demultiplexing the symbols to obtain one or more DMRSs from each symbol in the one or more physical uplink communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
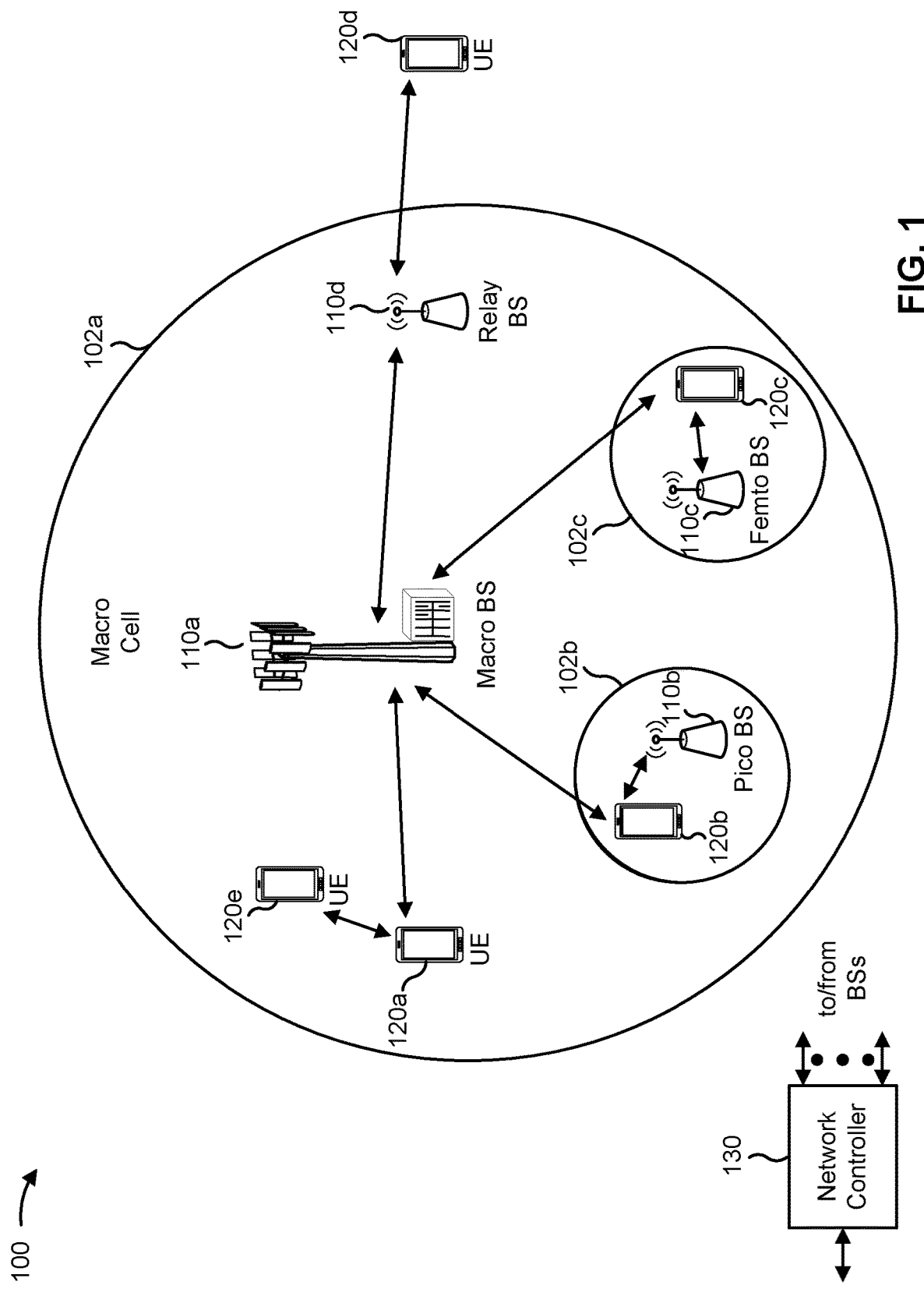
FIG. 1 is a diagram illustrating an example of a wireless network, in accordance with the present disclosure.

A user equipment (UE) may repeat the same message on a physical uplink channel to improve reliability, the entirety of the repeated messages being referred to as a "repetition." A repetition may have a format in which each repetition has the same length (e.g., same quantity of orthogonal frequency division multiplexing (OFDM) symbols).

The UE may transmit demodulation reference signals (DMRSs) to a base station in a repetition on a physical uplink channel to assist the base station with communications with the UE. The repetition may normally be configured to have four DMRSs. However, if repetitions are to be in a format where each repetition could have a different length, there may not be room for four DMRSs in a shorter repetition. In other words, a traditional DMRS design pattern may not work for repetitions of different sizes. If a DMRS configuration is to be specified for different sizes, this may require extra signaling. Otherwise, too many DMRSs or too few DMRSs may degrade communications and cause power, processing resources, and signaling resources to be wasted.

According to various aspects described herein, a UE may multiplex one or more DMRSs in each OFDM symbol. In this way, a DMRS pattern does not need to be determined for each repetition length, which may vary. As a result, the UE may conserve power, processing resources, and signaling resources that would otherwise be consumed by signaling or determining DMRS design patterns for physical uplink repetitions.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
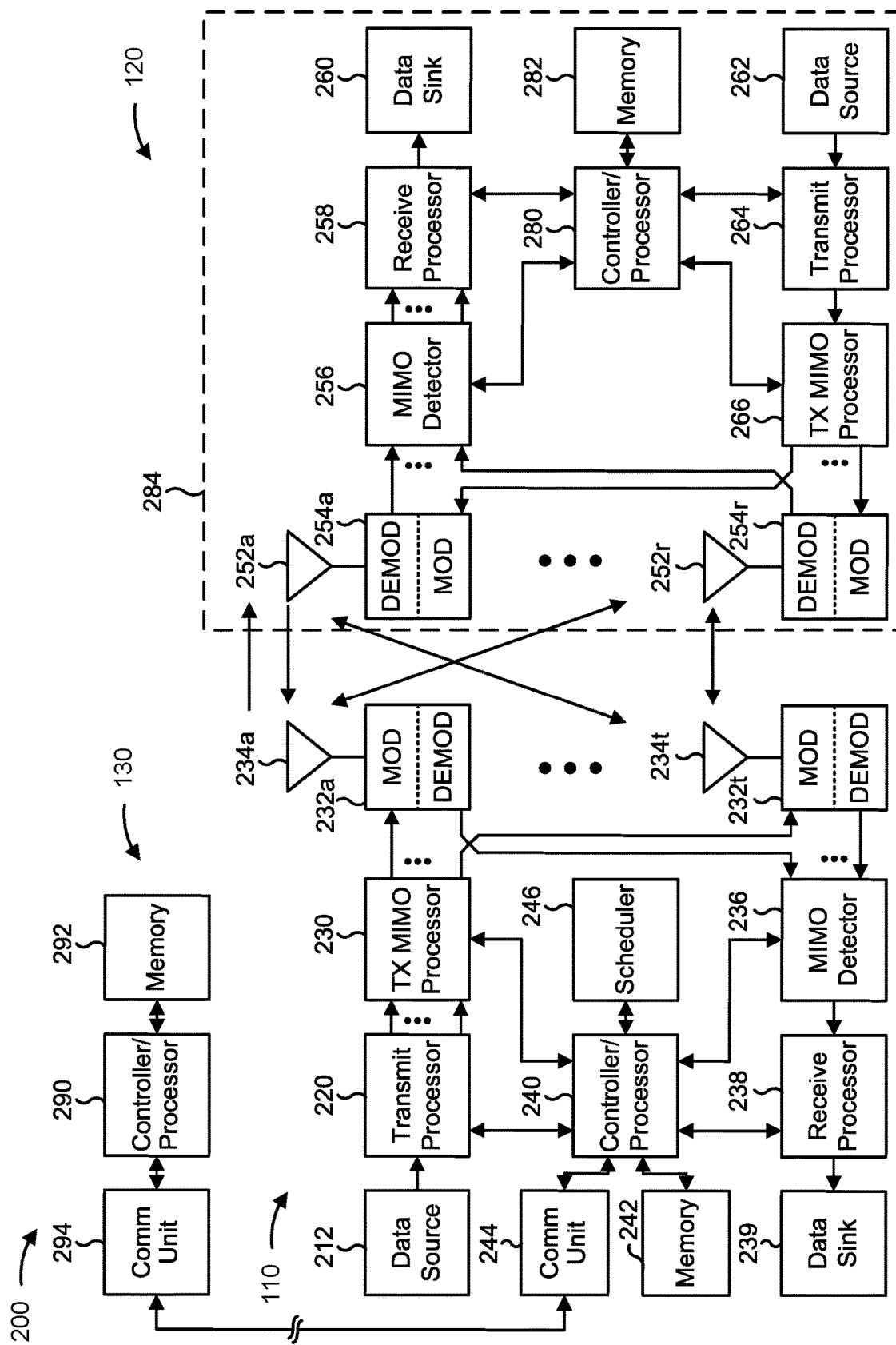
FIG. 2 is a diagram illustrating an example of a base station in communication with a UE in a wireless network, in accordance with the present disclosure.

FIG. 2 is a diagram illustrating an example 200 of abase station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-13).

Controller/processor 240 of base station 110, controller/processor 280 of UE 120, and/or any other component(s) of FIG. 2 may perform one or more techniques associated with DMRS multiplexing for uplink communications (e.g., repetitions), as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, UE 120 includes means for multiplexing one or more DMRSs with data or uplink control information (UCI) in each symbol of one or more physical uplink communications, and/or means for transmitting the symbols of the one or more physical uplink communications. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for combining virtual symbols, each representing an available uplink symbol in a plurality of slots, into a virtual row, means for assigning each of the virtual symbols from the virtual row to one or more virtual repetitions, independent of slot boundaries, and/or means for mapping the available uplink symbols in the plurality of slots to the one or more physical uplink repetitions based at least in part on the virtual symbols, representing the available uplink symbols, being assigned to the one or more virtual repetitions.

In some aspects, base station 110 includes means for receiving symbols from a UE in one or more physical uplink communications, and/or means for demultiplexing the symbols to obtain one or more DMRSs from each symbol in the one or more physical uplink communications. The means for the base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, base station 110 includes means for transmitting an indication to the UE to multiplex one or more DMRSs with UCI or data in each symbol of the one or more physical uplink communications.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
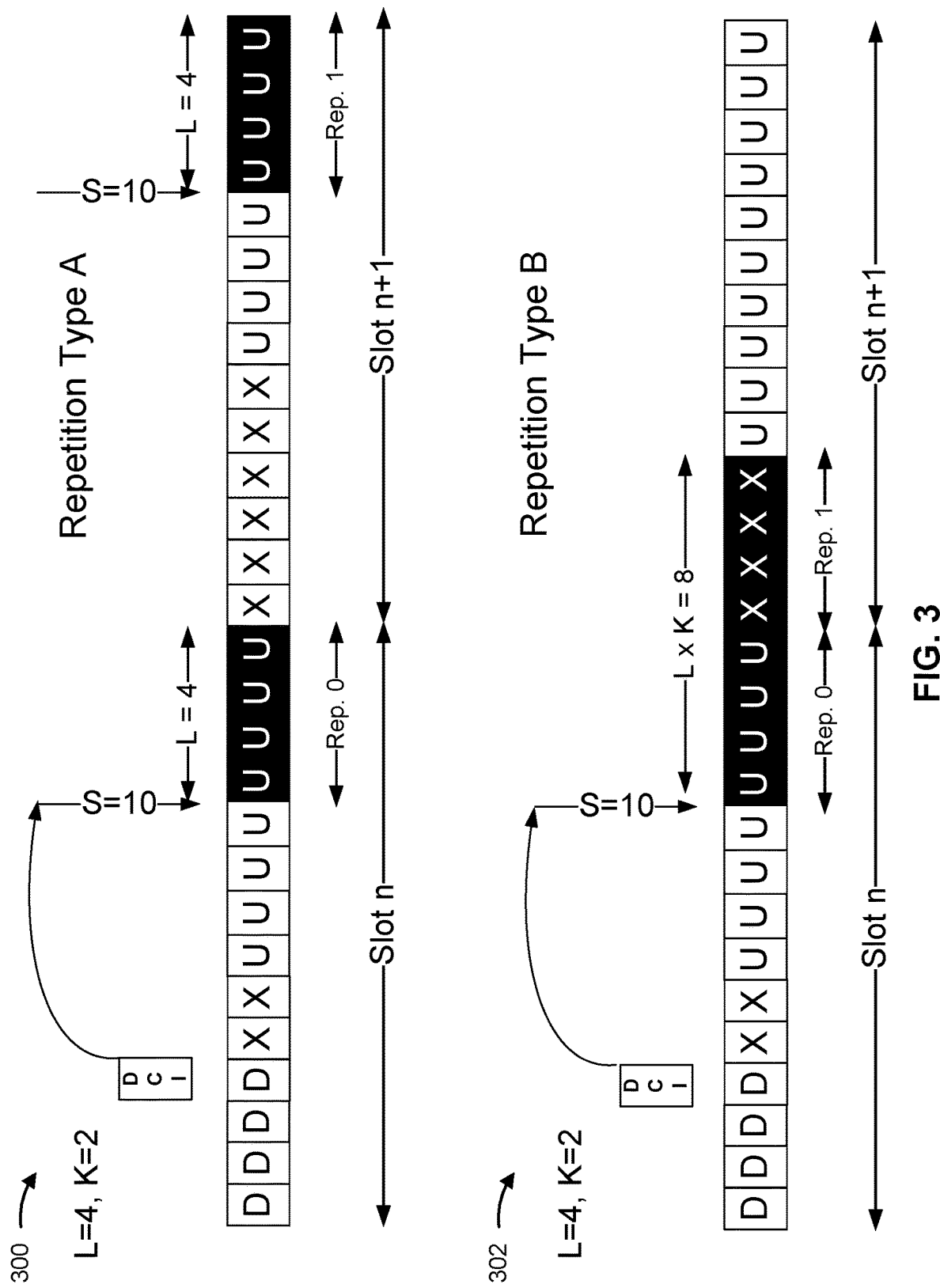
FIG. 3 is a diagram illustrating examples of physical uplink repetition types, in accordance with the present disclosure.

FIG. 3 is a diagram illustrating examples 300, 302 of physical uplink repetition types, in accordance with the present disclosure.

A UE may transmit UCI and DMRSs to a base station on a physical uplink control channel (PUCCH) in order for the base station to measure DMRSs and use information in the UCI to schedule transmissions for the UE. The PUCCH may carry UCI and DMRSs in different formats. The UE may also transmit data on a physical uplink shared channel (PUSCH) in different formats.

The UE may repeat the same message a certain quantity of times on a physical uplink channel to improve reliability, the entirety of the repeated messages being referred to as a "repetition." The message may include one or more symbols. A repetition may have a format in which each repetition has the same length (e.g., same quantity of OFDM symbols). The base station may dynamically indicate the length for a repetition and/or indicate a quantity of repetitions.

There may be different types of PUCCH repetitions and PUSCH repetitions. For example, there are two types of PUSCH repetitions, such as shown in FIG. 3. Example 300 shows repetition Type A, where there are an equal quantity of uplink (U) symbols for a repetition. For Type A, the same start and length indicator value (SLIV) may be used for each repetition. Accordingly, example 300 shows a quantity K of 2 repetitions with a length L of 4 that each start at a tenth symbol S of each slot.

Example 302 shows repetition Type B, where repetitions may span across slot boundaries and/or use different SLIVs. Example 302 shows a first repetition (Rep. 0) of 4 uplink symbols that starts at the tenth symbol of slot n, and a second repetition (Rep. 1) of 4 gap (X) symbols that starts at a beginning of slot n+1. Type B may involve a dynamic indication of a quantity of repetitions, inter-nominal PUSCH frequency hopping, a new U/D symbol interaction, and/or a new SLIV.

As indicated above, FIG. 3 provides examples. Other examples may differ from what is described with regard to FIG. 3.

Figure 4:
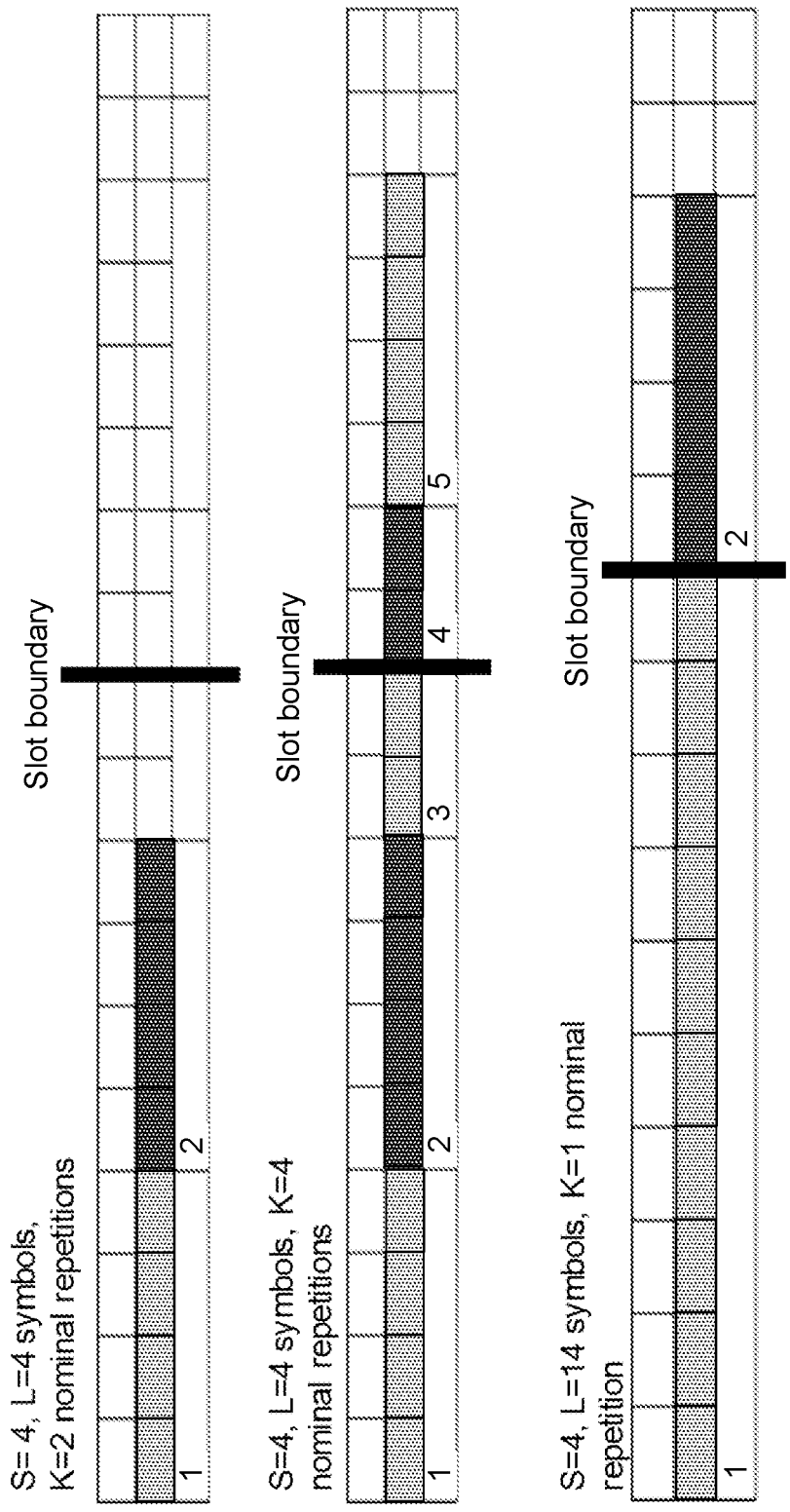
FIG. 4 is a diagram illustrating an example of physical uplink repetitions of different lengths, in accordance with the present disclosure.

FIG. 4 is a diagram illustrating an example 400 of physical uplink repetitions of different lengths, in accordance with the present disclosure.

In some aspects, physical uplink repetitions may be different lengths. This may be a result of slot boundaries. Example 400 shows three groups of repetitions: a top group, a middle group, and a bottom group. The top group shows two repetitions, where a first repetition has a length L of 4 symbols and a second repetition has a length S of 4 symbols. The first slot has a quantity K of 2 repetitions. The middle group has two repetitions of 4 symbols each, but due to a slot boundary, the slot has a third repetition of 2 symbols. The next slot has a fourth repetition of 2 symbols and a fifth repetition of 4 symbols. The bottom group has one long repetition of 14 symbols that fills up the first slot. The second slot starts with a repetition of 4 symbols. In other words, because of slot boundaries, repetitions may be of different lengths.

As indicated above, FIG. 4 is provided as an example. Other examples may differ from what is described with regard to FIG. 4.

Figure 5:
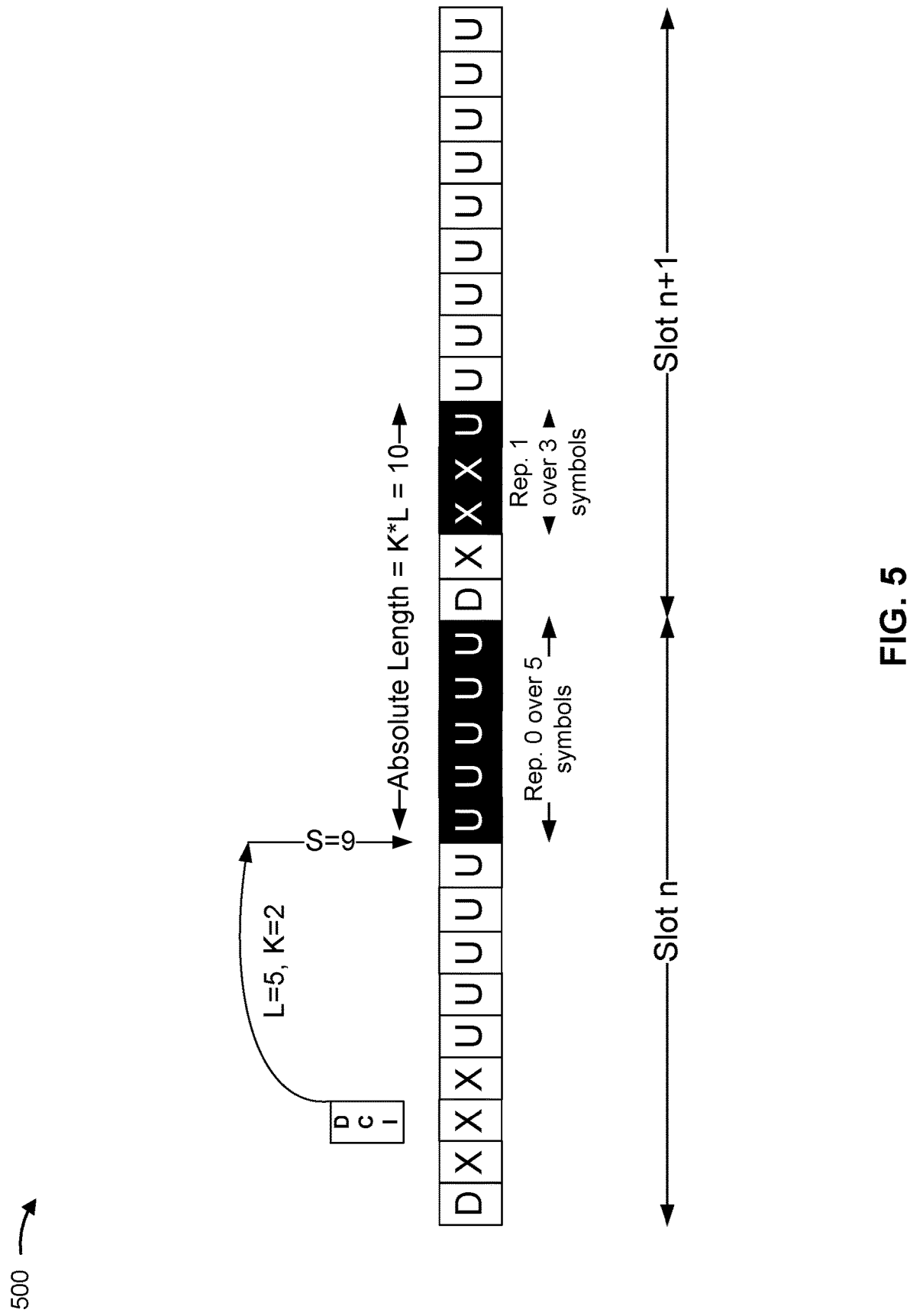
FIG. 5 is a diagram illustrating an example of physical uplink repetitions of different lengths, in accordance with the present disclosure.

FIG. 5 is a diagram illustrating an example 500 of physical uplink repetitions of different lengths, in accordance with the present disclosure.

In some aspects, physical uplink repetitions may be of different lengths because of segmentation around a slot border, semi-static downlink symbols, or invalid symbols (e.g., indicated by parameter InvalidSymbolPattern). A semi-static slot format indication or the parameter InvalidSymbolPattern may be used to determine usable symbols for PUSCH. A PUCCH repetition Type B format or a PUSCH Type B format may involve different length repetitions. Example 500 shows downlink control information (DCI) that indicates a quantity K of two repetitions, each being a length L of 5 symbols, for an absolute length of 10 symbols for both repetitions. The first repetition is to begin after 9 symbols.

Example 500 shows that the first repetition is 5 uplink (U) symbols, but a next symbol is a downlink (D) symbol from the base station. The downlink symbol is followed by a gap symbol (X), and the downlink and gap symbols break up the two repetitions. The second repetition is only 3 symbols, which is a different length than the first repetition. With the Type B format, slot boundaries, different lengths, and DMRS patterns may cause the UE to lose phase coherency between PUCCH or PUSCH repetitions.

As indicated above, FIG. 5 is provided as an example. Other examples may differ from what is described with regard to FIG. 5.

Figure 6:
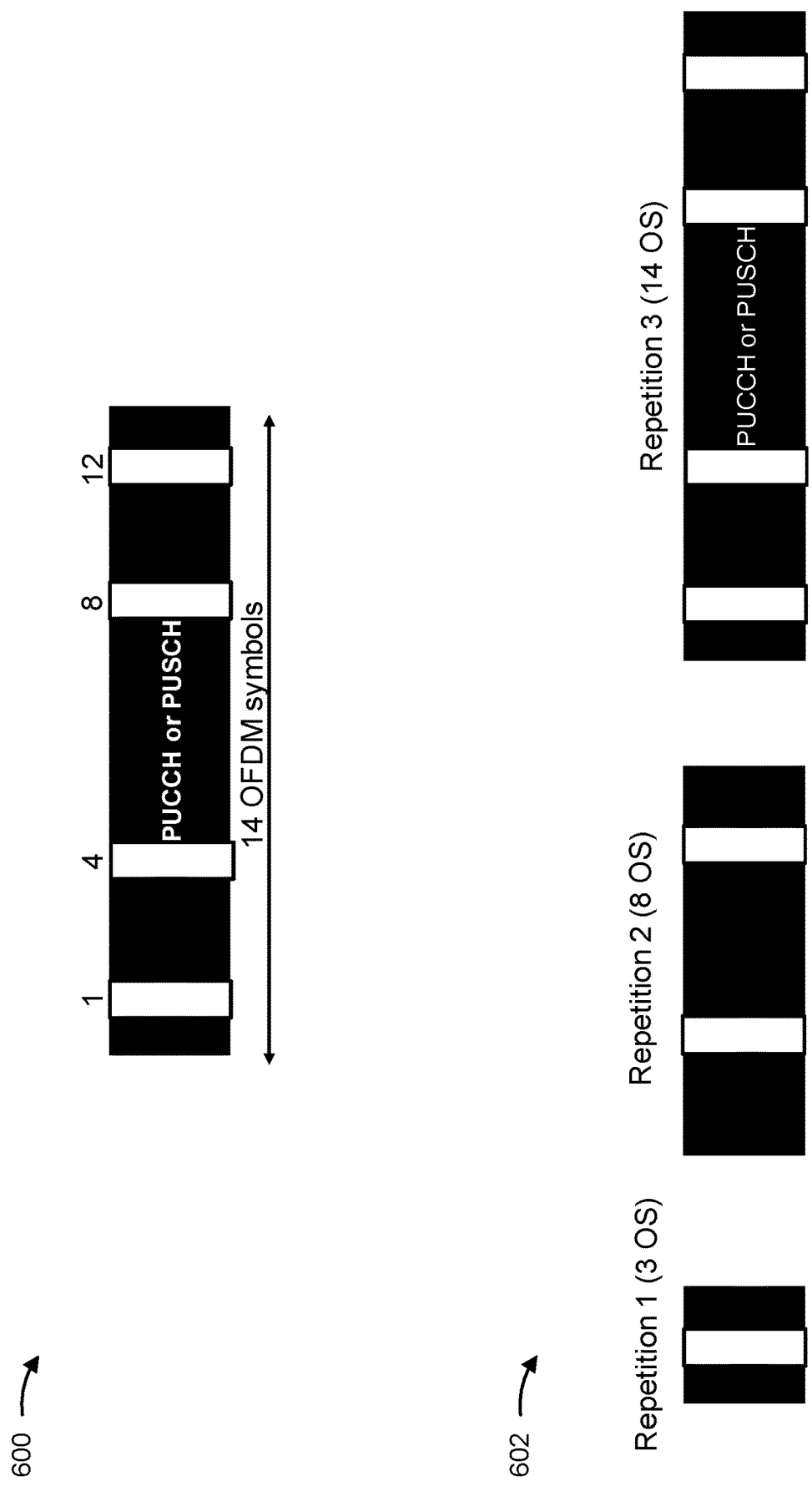
FIG. 6 is a diagram illustrating examples of physical uplink repetitions of different lengths, in accordance with the present disclosure.

FIG. 6 is a diagram illustrating examples 600, 602 of physical uplink repetitions of different lengths, in accordance with the present disclosure.

Example 600 shows possible DMRS locations in a slot of 14 OFDM symbols. Symbols 1, 4, 8, and 12 are highlighted, showing four DMRSs in the slot. However, if repetitions are to be of different lengths, as shown by example 602, there may not be room for four DMRSs. For a smaller repetition, such as repetition 1 with 3 OFDM symbols (OSs), only 1 DMRS may be appropriate. Traditional DMRS patterns do not work for a repetition with a single OS (orphan OS). If a second repetition is larger, such as repetition 2 with 8 OFDM symbols, 2 DMRSs may be appropriate. If a third repetition is 14 symbols, 4 DMRSs may be appropriate. In other words, a traditional DMRS design pattern may not work for repetitions of different sizes. If a DMRS configuration is to be specified for different sizes, this may require extra signaling. Otherwise, too many DMRSs or too few DMRSs may degrade communications and cause power, processing resources, and signaling resources to be wasted.

As indicated above, FIG. 6 provides examples. Other examples may differ from what is described with regard to FIG. 6.

Figure 7:
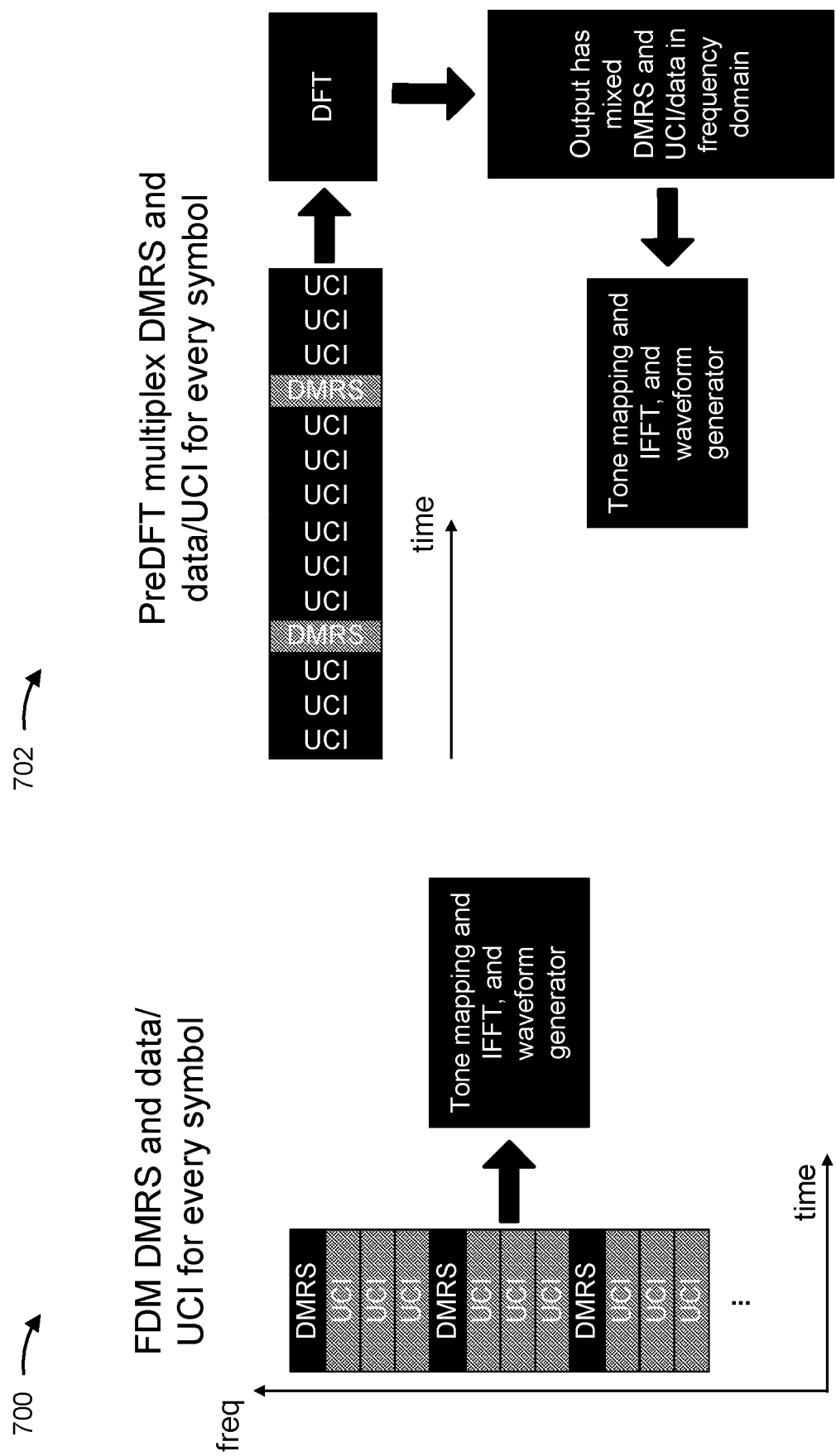
FIG. 7 is a diagram illustrating examples of demodulation reference signal (DMRS) multiplexing for uplink repetitions, in accordance with the present disclosure.

FIG. 7 is a diagram illustrating examples 700, 702 of DMRS multiplexing for uplink repetitions, in accordance with present disclosure.

According to various aspects described herein, a UE may multiplex a DMRS on each OFDM symbol. In this way, a DMRS pattern does not need to be determined for each repetition length, which may vary. As a result, the UE may conserve power, processing resources, and signaling resources that would otherwise be consumed by signaling or determining DMRS design patterns for physical uplink repetitions.

Example 700 shows, for frequency division multiplexing (FDM), that a UE may multiplex DMRSs and data or UCI for each symbol of a physical uplink repetition. Example 702 shows, for a DFT-s-OFDM waveform (transform precoding), that a UE may multiplex DMRSs and data or UCI for each symbol in a time domain before DFT. With DMRSs available in each OFDM symbol, PUCCH/PUSCH repetitions can cross slot boundaries and can be segmented by downlink symbols.

As indicated above, FIG. 7 provides examples. Other examples may differ from what is described with regard to FIG. 7.

Figure 8:
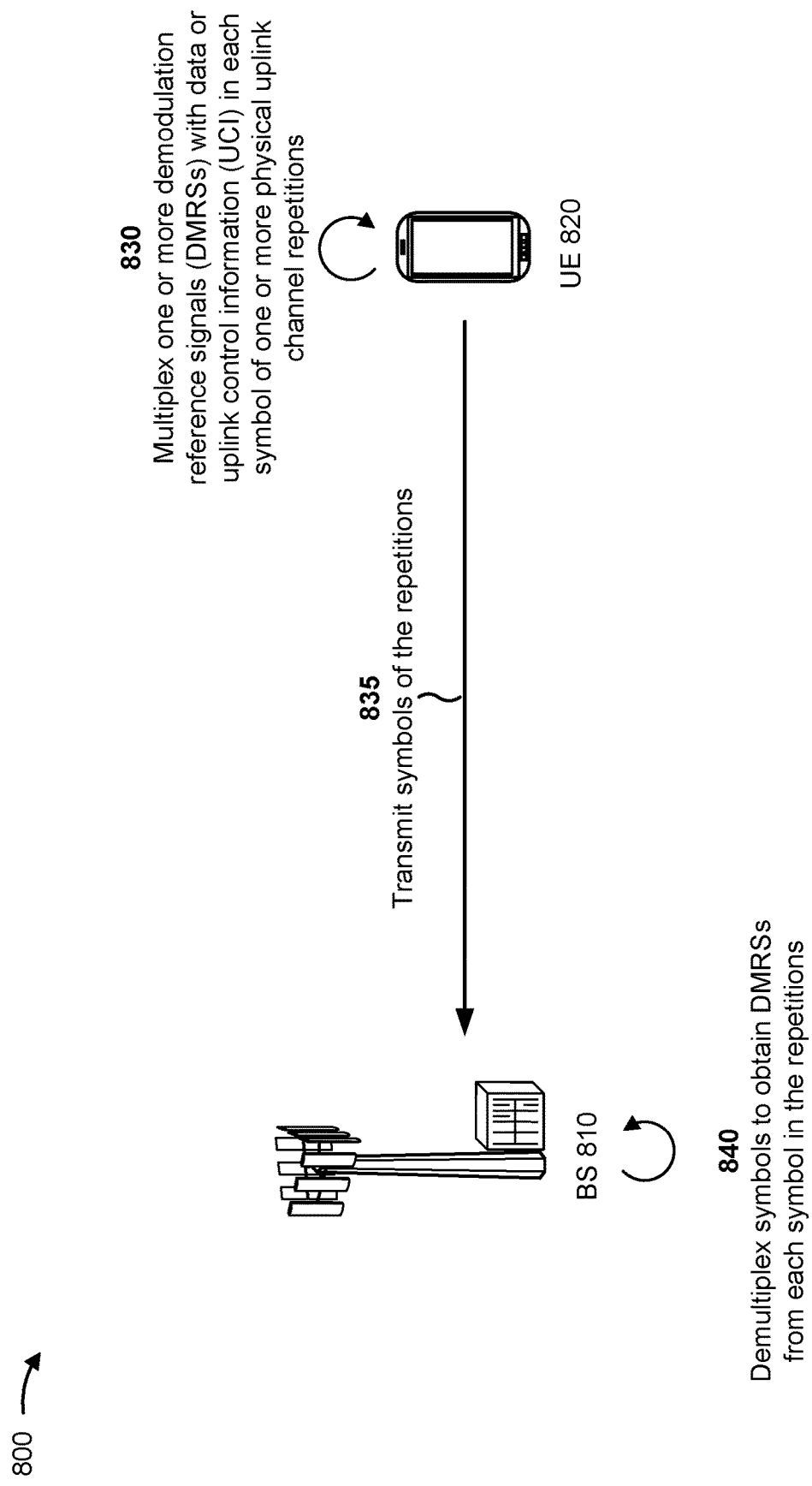
FIG. 8 is a diagram illustrating an example of DMRS multiplexing for uplink repetitions, in accordance with the present disclosure.

FIG. 8 is a diagram illustrating an example 800 of DMRS multiplexing for uplink repetitions, in accordance with the present disclosure. As shown in FIG. 8, example 800 includes communication between BS 810 (e.g., a BS 110 depicted in FIGS. 1 and 2) and a UE 820 (e.g., a UE 120 depicted in FIGS. 1 and 2). In some aspects, BS 810 and UE 820 may be included in a wireless network, such as wireless network 100. BS 810 and UE 820 may communicate on a wireless access link, which may include an uplink and a downlink.

As shown by reference number 830, UE 820 may multiplex one or more DMRSs with data or UCI in each OFDM symbol of one or more physical uplink communications, such as physical uplink channel repetitions. As shown by FIG. 7, multiplexing may be done in FDM or in a time domain. As shown by reference number 835, UE 820 may transmit the OFDM symbols of the repetitions. As shown by reference number 840, BS 810 may demultiplex OFDM symbols to obtain DMRSs from each symbol in the repetitions. BS 810 may also obtain UCI or data from the OFDM symbols.

As indicated above, FIG. 8 is provided as an example. Other examples may differ from what is described with regard to FIG. 8.

Figure 9:
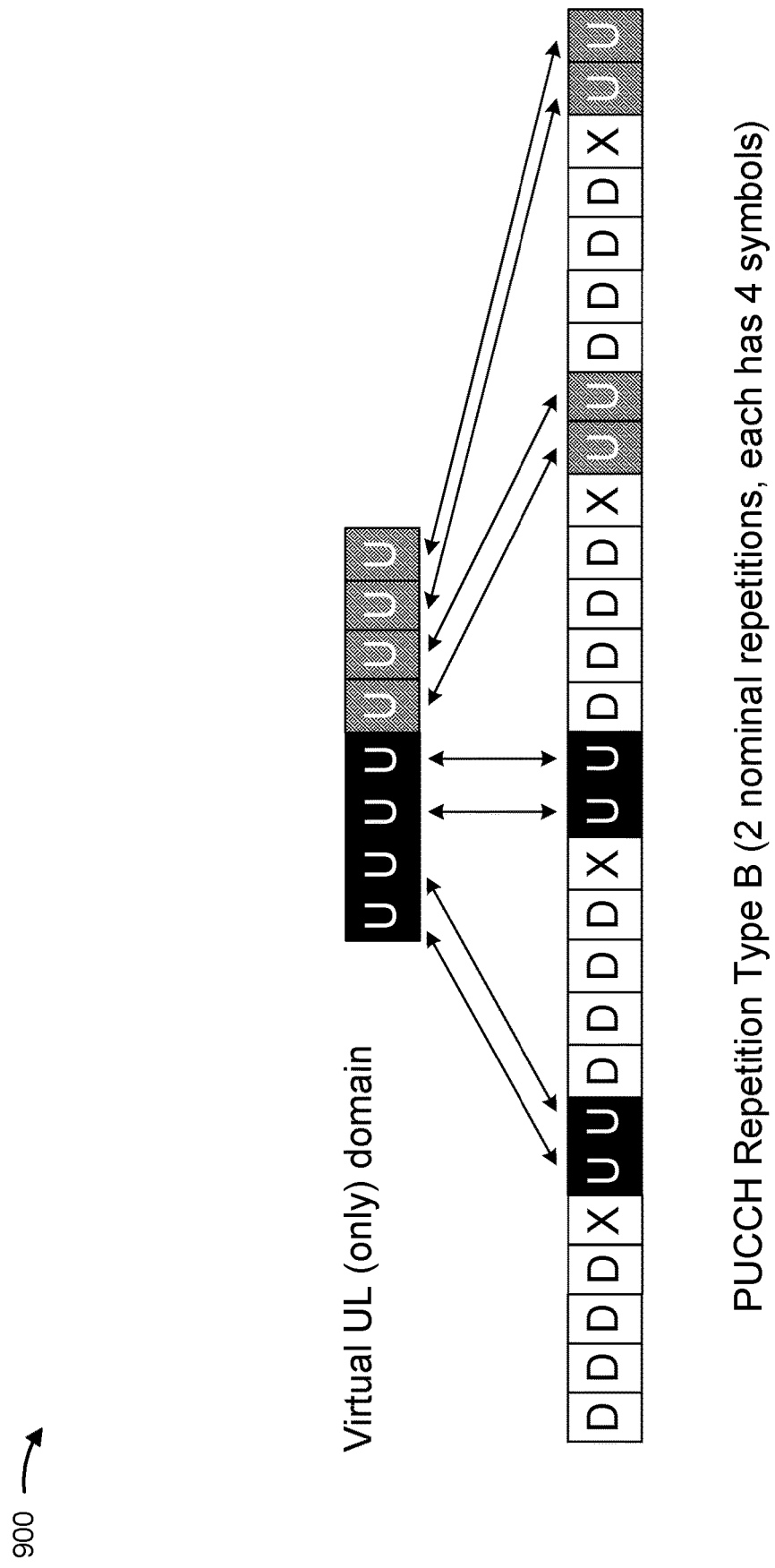
FIG. 9 is a diagram illustrating an example of DMRS multiplexing for uplink repetitions, in accordance with the present disclosure.

FIG. 9 is a diagram illustrating an example 900 of DMRS multiplexing for uplink repetitions, in accordance with the present disclosure.

If DMRSs are multiplexed in every OFDM symbol, there may be no need to rearrange repetitions due to slot boundaries. Rather, repetitions may be configured independently of slot boundaries. In some aspects, a UE may assign symbols to repetitions in a more flexible manner. Example 900 shows symbols for two slots, with uplink symbols spread out among the two slots. The UE may associate actual symbols with virtual symbols, which are shown as virtual uplink symbols in example 900. The UE may concatenate or combine the virtual symbols in a virtual domain and assign the virtual symbols to virtual repetitions. The virtual repetitions may be a same length or differing lengths. Because DMRSs are multiplexed in each symbol, the UE is free to assign the virtual symbols to any arrangement of virtual repetitions. Once virtual repetitions are formed, the UE may map the virtual repetitions to actual physical uplink repetitions. Accordingly, actual physical symbols are transmitted as part of the physical uplink repetitions to which they are assigned. In this way, DMRSs are transmitted in physical uplink repetitions without being hindered by slot boundaries or segmentations.

In other words, a nominal repetition may normally break into multiple actual repetitions due to a slot boundary or a downlink interruption. By multiplexing DMRSs in each symbol and by using virtual repetitions, the UE does not have to use the actual repetitions that are formed from a nominal repetition that is divided by a slot boundary or downlink interruption.

As indicated above, FIG. 9 is provided as an example. Other examples may differ from what is described with regard to FIG. 9.

Figure 10:
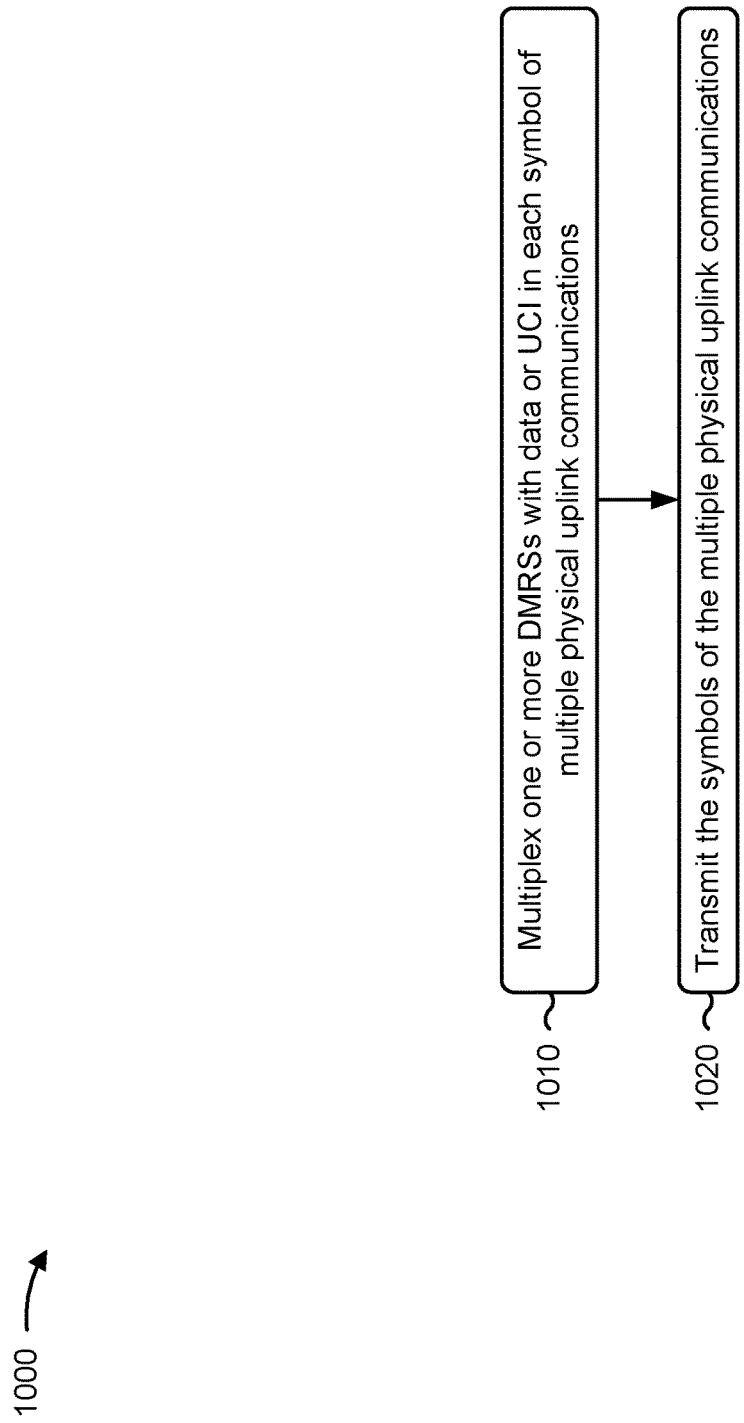
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120 depicted in FIGS. 1-2, UE 820 depicted in FIG. 8) performs operations associated with DMRS multiplexing for uplink communications. The uplink communications may include one or more repetitions.

As shown in FIG. 10, in some aspects, process 1000 may include multiplexing one or more DMRSs with data or UCI in each symbol (e.g., OFDM symbol) of one or more physical uplink communications (block 1010). For example, the UE (e.g., using multiplexer component 1208 depicted in FIG. 12) may multiplex one or more DMRSs with data or UCI in each symbol of one or more physical uplink communications, as described above. The one or more physical uplink communications may include one or more physical uplink repetitions.

As further shown in FIG. 10, in some aspects, process 1000 may include transmitting the symbols of the one or more physical uplink communications (block 1020). For example, the UE (e.g., using transmission component 1204 depicted in FIG. 12) may transmit the symbols of the one or more physical uplink communications, as described above.

Process 1000 may include additional aspects, such as any single aspect or any combination of aspects described below and/or in connection with one or more other processes described elsewhere herein.

In a first aspect, the one or more physical uplink repetitions are one of Type B PUCCH repetitions or Type B PUSCH repetitions.

In a second aspect, alone or in combination with the first aspect, the one or more physical uplink repetitions include a plurality of repetitions of different lengths.

In a third aspect, alone or in combination with one or more of the first and second aspects, multiplexing the one or more DMRSs includes, for an OFDM waveform, frequency division multiplexing the one or more DMRSs with the data or UCI.

In a fourth aspect, alone or in combination with one or more of the first through third aspects, multiplexing the one or more DMRSs includes, for a DFT-S-OFDM waveform, multiplexing the one or more DMRSs with the data or UCI in a time domain before DFT.

In a fifth aspect, alone or in combination with one or more of the first through fourth aspects, process 1000 includes combining virtual symbols, each representing an available uplink symbol in a plurality of slots, into a virtual row, assigning each of the virtual symbols from the virtual row to one or more virtual repetitions, independently of slot boundaries, and mapping the available uplink symbols in the plurality of slots to the one or more physical uplink repetitions based at least in part on the virtual symbols, representing the available uplink symbols, being assigned to the one or more virtual repetitions.

In a sixth aspect, alone or in combination with one or more of the first through fifth aspects, multiplexing the one or more DMRSs includes multiplexing the one or more DMRSs based at least in part on receiving an indication from a base station.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
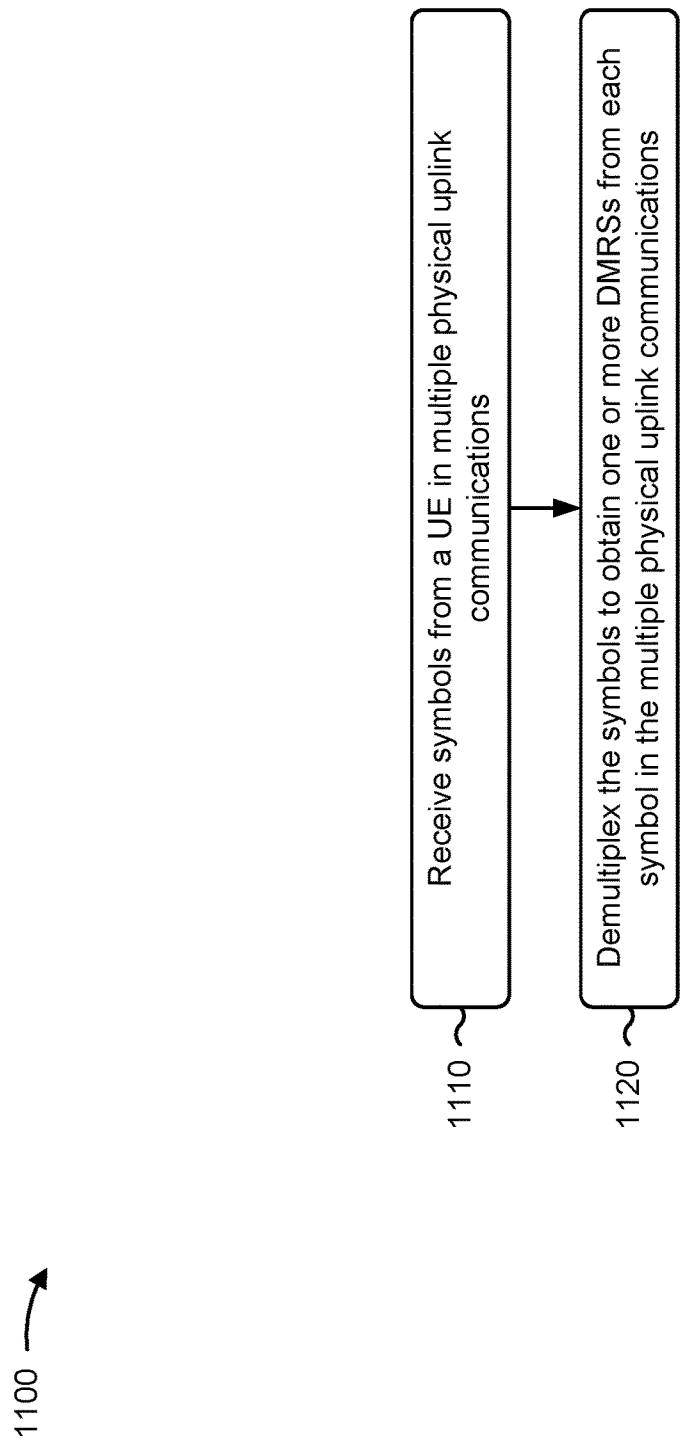
FIG. 11 is a diagram illustrating an example process performed, for example, by a base station, in accordance with the present disclosure.

FIG. 11 is a diagram illustrating an example process 1100 performed, for example, by a base station, in accordance with the present disclosure. Example process 1100 is an example where the base station (e.g., base station 110 depicted in FIGS. 1-2, BS 810 depicted in FIG. 8) performs operations associated with DMRS multiplexing for uplink communications, such as uplink repetitions.

As shown in FIG. 11, in some aspects, process 1100 may include receiving symbols from a UE in one or more physical uplink communications (block 1110). For example, the base station (e.g., using reception component 1302 depicted in FIG. 13) may receive symbols from a UE in one or more physical uplink communications, as described above.

As further shown in FIG. 11, in some aspects, process 1100 may include demultiplexing the symbols to obtain one or more DMRSs from each symbol in the one or more physical uplink communications (block 1120). For example, the base station (e.g., using demultiplexer component 1308 depicted in FIG. 13) may demultiplex the symbols to obtain one or more DMRSs from each symbol in the one or more physical uplink communications, as described above.

Process 1100 may include additional aspects, such as any single aspect or any combination of aspects described below and/or in connection with one or more other processes described elsewhere herein.

In a first aspect, the one or more physical uplink repetitions are one of Type B PUCCH repetitions or Type B PUSCH repetitions.

In a second aspect, alone or in combination with the first aspect, the one or more physical uplink repetitions include a plurality of repetitions of different lengths.

In a third aspect, alone or in combination with one or more of the first and second aspects, demultiplexing the symbols includes, for an OFDM waveform, demultiplexing the symbols in a frequency domain.

In a fourth aspect, alone or in combination with one or more of the first through third aspects, demultiplexing the symbols includes, for a DFT-S-OFDM waveform, demultiplexing the symbols in a time domain after DFT.

In a fifth aspect, alone or in combination with one or more of the first through fourth aspects, process 1100 includes transmitting an indication to the UE to multiplex one or more DMRSs with UCI or data in each symbol of the one or more physical uplink repetitions.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
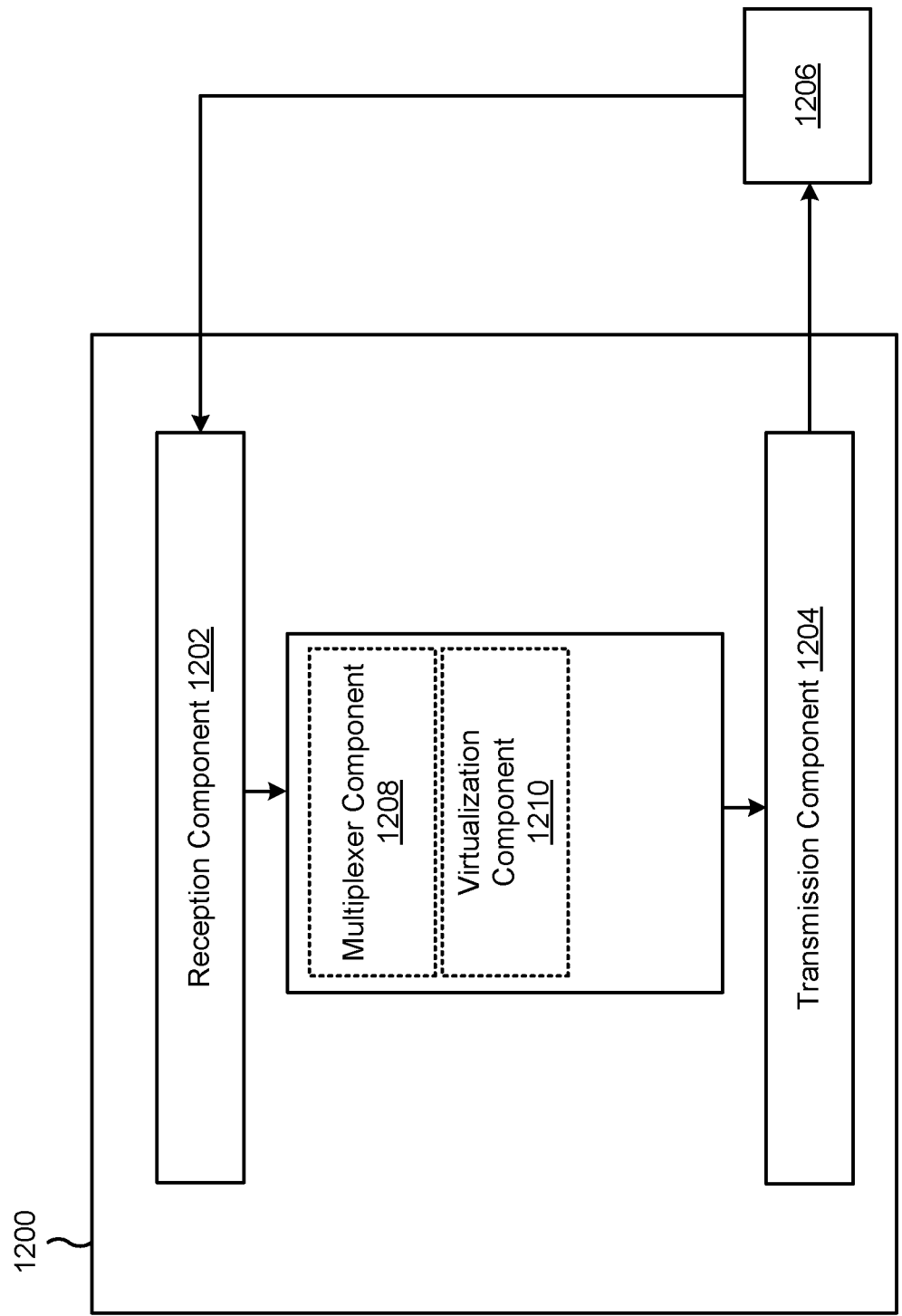
FIGS. 12-13 are block diagrams of example apparatuses for wireless communication, in accordance with the present disclosure.

FIG. 12 is a block diagram of an example apparatus 1200 for wireless communication. The apparatus 1200 may be a UE (e.g., a UE 120), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a multiplexer component 1208, or a virtualization component 1210, among other examples.

In some aspects, the apparatus 1200 may be configured to perform one or more operations described herein in connection with FIGS. 3-11. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be collocated with the reception component 1202 in a transceiver.

The multiplexer component 1208 may multiplex one or more DMRSs with data or UCI in each symbol of one or more physical uplink communications. In some aspects, the multiplexer component 1208 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The transmission component 1204 may transmit the symbols of the one or more physical uplink communications.

The virtualization component 1210 may combine virtual symbols, each representing an available uplink symbol in a plurality of slots, into a virtual row. In some aspects, the virtualization component 1210 may include a modulator, a transmit MIMO processor, a transmit processor, a controller/processor, a memory, or a combination thereof, of the UE described above in connection with FIG. 2.

The virtualization component 1210 may assign each of the virtual symbols from the virtual row to one or more virtual repetitions, independent of slot boundaries. In some aspects, the assignment component may include a modulator, a transmit MIMO processor, a transmit processor, a controller/processor, a memory, or a combination thereof, of the UE described above in connection with FIG. 2.

The virtualization component 1210 may map the available uplink symbols in the plurality of slots to the one or more physical uplink repetitions based at least in part on the virtual symbols, representing the available uplink symbols, being assigned to the one or more virtual repetitions.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
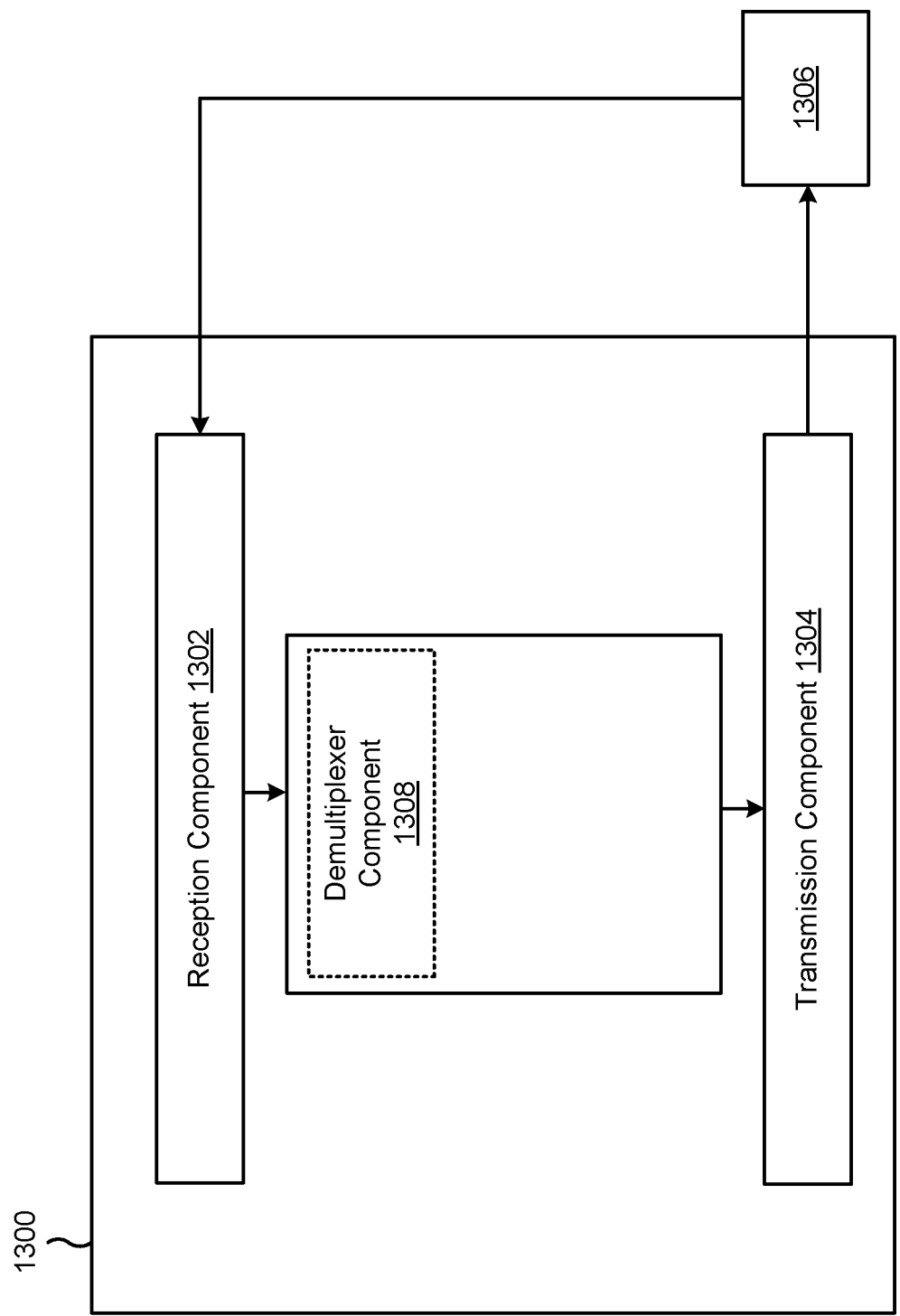

FIG. 13 is a block diagram of an example apparatus 1300 for wireless communication. The apparatus 1300 may be a base station (e.g., base station 110), or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a demultiplexer component 1308, among other examples.

In some aspects, the apparatus 1300 may be configured to perform one or more operations described herein in connection with FIGS. 3-11. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be collocated with the reception component 1302 in a transceiver.

The reception component 1302 may receive symbols from a UE in one or more physical uplink communications. The demultiplexer component 1308 may demultiplex the symbols to obtain one or more DMRSs from each symbol in the one or more physical uplink communications. In some aspects, the demultiplexer component 1308 may include one or more antennas, a demodulator, a MIMO detector, a receive processor, a controller/processor, a memory, or a combination thereof, of the base station described above in connection with FIG. 2.

The transmission component 1304 may transmit an indication to the UE to multiplex one or more DMRSs with UCI or data in each symbol of the one or more physical uplink communications.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: multiplexing one or more demodulation reference signals (DMRSs) with data or uplink control information (UCI) in each symbol of one or more physical uplink communications; and transmitting the symbols of the one or more physical uplink communications.

Aspect 2: The method of Aspect 1, wherein the one or more physical uplink communications include one or more physical uplink repetitions.

Aspect 3: The method of Aspect 2, wherein the one or more physical uplink repetitions are one of Type B physical uplink control channel repetitions or Type B physical uplink shared channel repetitions.

Aspect 4: The method of Aspect 2 or 3, wherein the one or more physical uplink repetitions include a plurality of repetitions of different lengths.

Aspect 5: The method of any of Aspects 2-4, further comprising: combining virtual symbols, each representing an available uplink symbol in a plurality of slots, into a virtual row; assigning each of the virtual symbols from the virtual row to one or more virtual repetitions, independent of slot boundaries; and mapping the available uplink symbols in the plurality of slots to the one or more physical uplink repetitions based at least in part on the virtual symbols, representing the available uplink symbols, being assigned to the one or more virtual repetitions.

Aspect 6: The method of any of Aspects 1-5, wherein multiplexing the one or more DMRSs includes, for an orthogonal frequency division multiplexing (OFDM) waveform, frequency division multiplexing the one or more DMRSs with the data or UCI.

Aspect 7: The method of any of Aspects 1-6, wherein multiplexing the one or more DMRSs includes, for a discrete Fourier transform (DFT) spread orthogonal frequency division multiplexing waveform, multiplexing the one or more DMRSs with the data or UCI in a time domain before DFT.

Aspect 8: The method of any of Aspects 1-7, wherein multiplexing the one or more DMRSs includes multiplexing the one or more DMRSs based at least in part on receiving an indication from a base station.

Aspect 9: A method of wireless communication performed by a base station, comprising: receiving symbols from a user equipment (UE) in one or more physical uplink communications; and demultiplexing the symbols to obtain one or more demodulation reference signals (DMRSs) from each symbol in the one or more physical uplink communications.

Aspect 10: The method of Aspect 9, wherein the one or more physical uplink communications include one or more physical uplink repetitions.

Aspect 11: The method of Aspect 10, wherein the one or more physical uplink repetitions are one of Type B physical uplink control channel repetitions or Type B physical uplink shared channel repetitions.

Aspect 12: The method of Aspect 10, wherein the one or more physical uplink repetitions include a plurality of repetitions of different lengths.

Aspect 13: The method of any of Aspects 9-12, wherein demultiplexing the symbols includes, for an orthogonal frequency division multiplexing (OFDM) waveform, demultiplexing the symbols in a frequency domain.

Aspect 14: The method of any of Aspects 9-12, wherein demultiplexing the symbols includes, for a discrete Fourier transform (DFT) spread orthogonal frequency division multiplexing waveform, demultiplexing the symbols in a time domain after DFT.

Aspect 15: The method of any of Aspects 9-14, further comprising transmitting an indication to the UE to multiplex one or more DMRSs with uplink control information or data in each symbol of the one or more physical uplink communications.

Aspect 16: An apparatus for wireless communication at a device, comprising a processor; memory coupled with the processor; and instructions stored in the memory and executable by the processor to cause the apparatus to perform the method of one or more of Aspects 1-15.

Aspect 17: A device for wireless communication, comprising a memory and one or more processors coupled to the memory, the one or more processors configured to perform the method of one or more of Aspects 1-15.

Aspect 18: An apparatus for wireless communication, comprising at least one means for performing the method of one or more of Aspects 1-15.

Aspect 19: A non-transitory computer-readable medium storing code for wireless communication, the code comprising instructions executable by a processor to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    memory;
    one or more processors coupled to the memory; and
    instructions stored in the memory and operable, when executed by the one or more processors, to cause the UE to:
        multiplex one or more demodulation reference signals (DMRSs) with data or uplink control information (UCI) in each symbol of one or more physical uplink communications, the one or more physical uplink communications including one or more physical uplink repetitions;
        combine virtual symbols, each representing an available uplink symbol in a plurality of slots, into a virtual row;
        assign each of the virtual symbols from the virtual row to one or more virtual repetitions, independent of slot boundaries;
        map the available uplink symbols in the plurality of slots to the one or more physical uplink repetitions based at least in part on the virtual symbols, representing the available uplink symbols, being assigned to the one or more virtual repetitions; and transmit the one or more physical uplink communications.

2. The UE of claim 1, wherein the one or more physical uplink repetitions are one of Type B physical uplink control channel repetitions or Type B physical uplink shared channel repetitions.

3. The UE of claim 1, wherein the one or more physical uplink repetitions include a plurality of repetitions of different lengths.

4. The UE of claim 1, wherein the instructions, operable to cause the UE to multiplex the one or more DMRSs, are operable to cause the UE to, for an orthogonal frequency division multiplexing (OFDM) waveform, frequency division multiplex the one or more DMRSs with the data or UCI.

5. The UE of claim 1, wherein the instructions, operable to cause the UE to multiplex the one or more DMRSs, are operable to cause the UE to, for a discrete Fourier transform (DFT) spread orthogonal frequency division multiplexing waveform, multiplex the one or more DMRSs with the data or UCI in a time domain before DFT.

6. The UE of claim 1, wherein the instructions, operable to cause the UE to multiplex the one or more DMRSs, are operable to cause the UE to multiplex the one or more DMRSs based at least in part on receiving an indication from a base station.

7. A method of wireless communication performed by a user equipment (UE), comprising:

multiplexing one or more demodulation reference signals (DMRSs) with data or uplink control information (UCI) in each symbol of one or more physical uplink communications, the one or more physical uplink communications including one or more physical uplink repetitions;

combining virtual symbols, each representing an available uplink symbol in a plurality of slots, into a virtual row;

assigning each of the virtual symbols from the virtual row to one or more virtual repetitions, independent of slot boundaries; and mapping the available uplink symbols in the plurality of slots to the one or more physical uplink repetitions based at least in part on the virtual symbols, representing the available uplink symbols, being assigned to the one or more virtual repetitions; and transmitting the one or more physical uplink communications.

8. The method of claim 7, wherein the one or more physical uplink repetitions are one of Type B physical uplink control channel repetitions or Type B physical uplink shared channel repetitions.

9. The method of claim 7, wherein the one or more physical uplink repetitions include a plurality of repetitions of different lengths.

10. The method of claim 7, wherein multiplexing the one or more DMRSs includes, for an orthogonal frequency division multiplexing (OFDM) waveform, frequency division multiplexing the one or more DMRSs with the data or UCI.

11. The method of claim 7, wherein multiplexing the one or more DMRSs includes, for a discrete Fourier transform (DFT) spread orthogonal frequency division multiplexing waveform, multiplexing the one or more DMRSs with the data or UCI in a time domain before DFT.

12. The method of claim 7, wherein multiplexing the one or more DMRSs includes multiplexing the one or more DMRSs based at least in part on receiving an indication from a base station.

13. A user equipment (UE) for wireless communication, comprising:

memory;

one or more processors coupled to the memory; and instructions stored in the memory and operable, when executed by the one or more processors, to cause the UE to:

multiplex one or more demodulation reference signals (DMRSs) with data or uplink control information (UCI) in each symbol of one or more physical uplink communications;

assign virtual symbols to one or more virtual repetitions independent of slot boundaries, each of the virtual symbols representing an available uplink symbol in a plurality of slots;

map the available uplink symbols in the plurality of slots to the one or more physical uplink communications based at least in part on the virtual symbols, representing the available uplink symbols, being assigned to the one or more virtual repetitions; and transmit the one or more physical uplink communications.

14. The UE of claim 13, wherein the one or more physical uplink communications include one or more physical uplink repetitions.

15. The UE of claim 14, wherein the one or more physical uplink repetitions are one of Type B physical uplink control channel repetitions or Type B physical uplink shared channel repetitions.

16. The UE of claim 14, wherein the one or more physical uplink repetitions include a plurality of repetitions of different lengths.

17. The UE of claim 13, wherein the instructions, operable to cause the UE to multiplex the one or more DMRSs, are operable to cause the UE to, for an orthogonal frequency division multiplexing (OFDM) waveform, frequency division multiplex the one or more DMRSs with the data or UCI.

18. The UE of claim 13, wherein the instructions, operable to cause the UE to multiplex the one or more DMRSs, are operable to cause the UE to, for a discrete Fourier transform (DFT) spread orthogonal frequency division multiplexing waveform, multiplex the one or more DMRSs with the data or UCI in a time domain before DFT.

19. The UE of claim 13, wherein the instructions, operable to cause the UE to multiplex the one or more DMRSs, are operable to cause the UE to multiplex the one or more DMRSs based at least in part on receiving an indication from a base station.

20. A method of wireless communication performed by a user equipment (UE), comprising:

multiplexing one or more demodulation reference signals (DMRSs) with data or uplink control information (UCI) in each symbol of one or more physical uplink communications;

assigning virtual symbols to one or more virtual repetitions independent of slot boundaries, each of the virtual symbols representing an available uplink symbol in a plurality of slots;

mapping the available uplink symbols in the plurality of slots to the one or more physical uplink communications based at least in part on the virtual symbols, representing the available uplink symbols, being assigned to the one or more virtual repetitions; and transmitting the one or more physical uplink communications.

21. The method of claim 20, wherein the one or more physical uplink communications include one or more physical uplink repetitions.

22. The method of claim 21, wherein the one or more physical uplink repetitions are one of Type B physical uplink control channel repetitions or Type B physical uplink shared channel repetitions.

23. The method of claim 21, wherein the one or more physical uplink repetitions include a plurality of repetitions of different lengths.

24. The method of claim 20, wherein multiplexing the one or more DMRSs includes, for an orthogonal frequency division multiplexing (OFDM) waveform, frequency division multiplexing the one or more DMRSs with the data or UCI.

25. The method of claim 20, wherein multiplexing the one or more DMRSs includes, for a discrete Fourier transform (DFT) spread orthogonal frequency division multiplexing waveform, multiplexing the one or more DMRSs with the data or UCI in a time domain before DFT.

26. The method of claim 20, wherein multiplexing the one or more DMRSs includes multiplexing the one or more DMRSs based at least in part on receiving an indication from a base station.

* * * * *